United States Patent [19]
Zahnd

[11] 4,110,743
[45] Aug. 29, 1978

[54] WIRELESS PAGING RECEIVER

[75] Inventor: Hans Zahnd, Bern, Switzerland

[73] Assignee: Hasler AG, Bern, Switzerland

[21] Appl. No.: 723,297

[22] Filed: Sep. 14, 1976

Related U.S. Application Data

[63] Continuation-in-part of Ser. No. 595,290, Jul. 11, 1975, abandoned.

[30] Foreign Application Priority Data

Jul. 11, 1974 [CH] Switzerland .................. 9497/74

[51] Int. Cl.$^2$ ............................................. H04B 7/00
[52] U.S. Cl. ..................................... 340/311; 325/55;
325/64; 325/364; 340/147 PC; 340/167 R
[58] Field of Search .......... 340/311, 147 PC, 147 LP,
340/155, 168 R, 159, 167 R; 325/55, 64, 58,
364; 178/66 R

[56] References Cited

U.S. PATENT DOCUMENTS

| 3,469,243 | 9/1969 | Willcox et al. ................. 340/167 R |
| 3,684,965 | 8/1972 | Gautney et al. .................... 325/64 |
| 3,768,090 | 10/1973 | Williams .......................... 340/311 |
| 3,806,922 | 4/1974 | Isbister .............................. 325/55 |
| 3,835,387 | 9/1974 | Rooks et al. ........................ 325/55 |
| 3,836,888 | 9/1974 | Boenke et al. ................... 178/66 R |
| 3,846,783 | 11/1974 | Apsell et al. ..................... 340/311 |
| 3,851,251 | 11/1974 | Wigner et al. ................... 340/311 |
| 3,859,475 | 1/1975 | Wulfsberg et al. .................. 325/64 |

*Primary Examiner*—John W. Caldwell, Sr.
*Assistant Examiner*—James J. Groody
*Attorney, Agent, or Firm*—Brady, O'Boyle & Gates

[57] ABSTRACT

A wireless paging receiver to be called up individually or as member of a group of receivers by a binary modulated carrier frequency call telegram. Each call telegram contains an address. Each individual address is composed by code words selected from a certain number of patterns. In a group call address one or more code words are replaced by a group call pattern, so that all receivers are called whose addresses contain the remaining code word patterns. For coding the address in the receiver only one connection must be positioned for each address code word. Messages can be transmitted with the call telegram and different call signals of different lengths generated. A parity check of the received call telegram is performed with little additional material.

6 Claims, 10 Drawing Figures

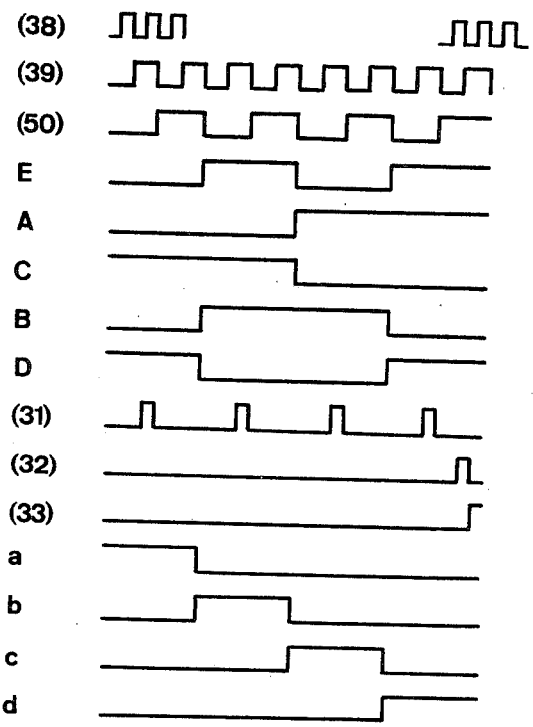
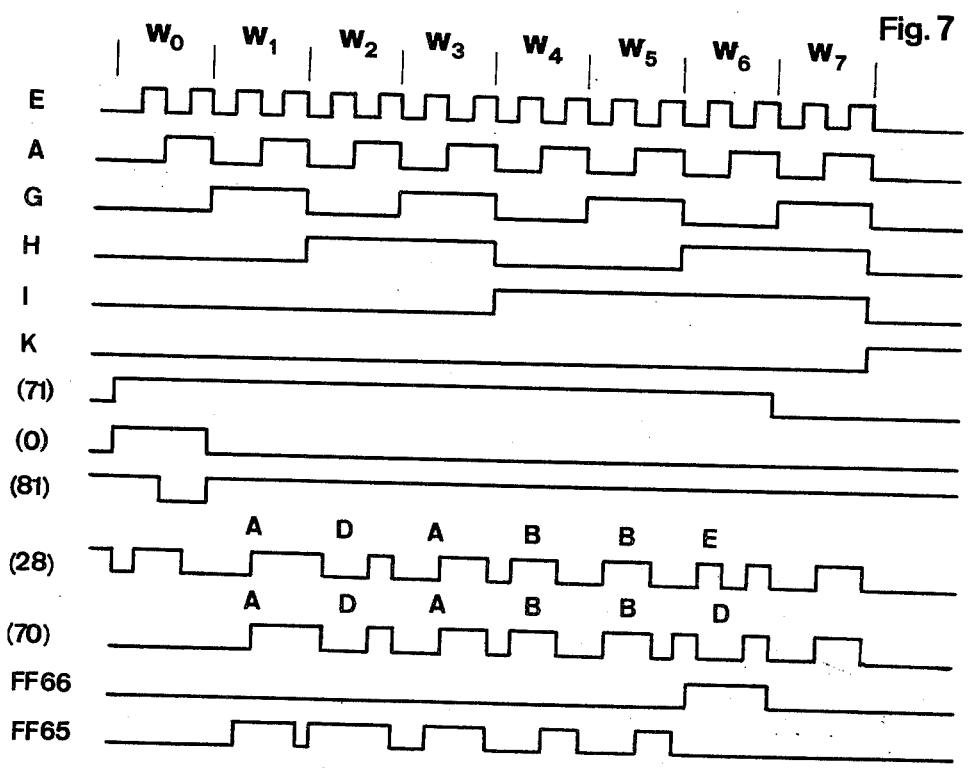
Fig. 6
Fig. 7

WIRELESS PAGING RECEIVER

CROSS-REFERENCE TO RELATED APPLICATION

This application is a continuation-in-part of my application Ser. No. 595,290 filed July 11, 1975, in the name of Hans Zahnd, now abandoned.

FIELD OF THE INVENTION

The invention relates to communication systems, and more particularly to a selective calling system, in which a paritcular receiver, or group of receivers, among many similar receivers is notified by means of a digitally coded signal that is being called by a transmitter associated with the system.

Selective calling systems are useful in paging systems. In the receivers, the calling signals are routed to a decoder, which provides a suitable output upon reception of a call code identified with that receiver. The output may operate an alarm device to alert the user that the receiver has been called, or it may condition the receiver for reception of a message. The selective calling detector, therefore, makes it possible to call any individual receiver.

DESCRIPTION OF THE PRIOR ART

It is known from U.S. Pat. No. 3,835,387 to provide a selective paging system, wherein a transmitter generates digitally modulated call address signals. In each receiver the call signals are routed to a decoder, where they are compared with an internally generated code signal. This code signal is stored in a read-only memory, which has to be programmed separately and differently for each receiver.

It is further known for U.S. Pat. No. 3,510,777 to provide groups call facilities in a wireless paging system employing digitally coded call signals by abbreviating the individual call addresses. This method gives only a limited number of group call facilities and uses addresses of variable length which complicates receiver organization.

OBJECTS OF THE INVENTION

It is an object of the invention to facilitate the programming of the receivers of the paging system and to provide programming means which can easily be changed to another code address.

It is another object of the invention to provide a multiplicity of group call combinations for a paging system.

It is another object of the invention to transmit messages included in the call telegram using a minimum of bits for a given number of messages, which messages may produce a variation of the acoustical call signal.

It is a further object of the invention to ascertain the reliability of the calling process by eliminating disturbed calls using a minimum of additional logic circuits for this purpose.

SUMMARY OF THE INVENTION

In accordance with one aspect of the present invention each call telegram consists of code words, and all call code words of the same number of bits.

Each call telegram includes and address composed of code words which are selected from a plurality of bit patterns including address patterns and a group call pattern. Call telegrams for calling a certain receiver have an address which is assigned to the receiver and consists only of address patterns. Group call telegrams for simultaneously calling a group of receivers have an address contain address patterns which are identical for all receivers of the group, each code word which is not the same in the addresses of all of these receivers is replaced by the group call pattern. A demodulator is supplied by the carrier frequency call telegrams and delivers for each telegram the bit sequence corresponding thereto. A clock pulses generator is controlled by said demodulator and generates a clock pulse sequence in synchronism with the bits of the received telegram. A bit sequences generator is controlled by said clock pulse sequence and generates synchronously to the reception of the bits of the code words of the received telegram a first and a second bit sequence. The first bit sequence is equal to the bit sequence of the individual address of the receiver, and the second bit sequences consists only of group call patterns. A comparator compares bit by bit and code word by code word the address of the received code telegram with the first and with the second bit sequence and delivers an output signal if each code word of the received address matches with either the respective code word of the first or with that of the second bit sequence. A signal generator is supplied by the output signals and delivers an acoustical signal.

In the preferred embodiment of the bit sequence generator the address programming is performed by establishing one connection only for each address word in a matrix, wherein one set of conductors is carrying each a different pulse pattern and the conductors of another set of conductors crossing the conductors of the first set are assigned each to one word position in a call telegram.

In a preferred embodiment of the invention the mentioned clock pulses generator is supplied with the received carrier frequency and generates the clock pulse sequence by dividing the carrier frequency by an integral number. When frequency modulation is used for transmission, the modulated frequency is supplied to the divider, so that the intervals between the pulses of the pulse sequence may not be equal. This is without importance since the bit lengths have been determined in the transmission by dividing the same modulated frequency. In an embodiment of the invention the mentioned divider is also used for determination of the length of the output pulse and thereby of the generated acoustical signal. At the beginning of the output pulse the audio frequency generator is connected to an input of the divider and ends for a certain state of the divider output.

A coded message chosen from a set of messages may be included in the call telegram. With 9 bits, reserved for this purpose, 29 different messages can be transmitted. These bits are stored during the reception of the call telegram, and at the end of the reception of a telegram with an address assigned to the receiver, these bits are decoded and an output corresponding to the message is activated. A signal on one of such outputs may be used for altering the division, ratio of the divider, thereby changing the length of the acoustic signal. In this way different call signals may be transmitted.

The circuit for comparing the receiver call address with the internally generated address may be used for a parity check by generating in a known manner a parity word from the received telegram. In the comparator, the parity word thus generated is compared with a parity word following the address in the receiver call telegram.

BRIEF DESCRIPTION OF THE DRAWINGS

A paging receiver embodying the invention will be describes with reference to the following figures:

FIG. 6 represents pulse diagrams repeated during the reception of each code word of a call telegram;

FIG. 7 represents pulse diagrams occuring during the reception of a call telegram;

DESCRIPTION OF THE PREFERRED EMBODIMENT

Figure 1:
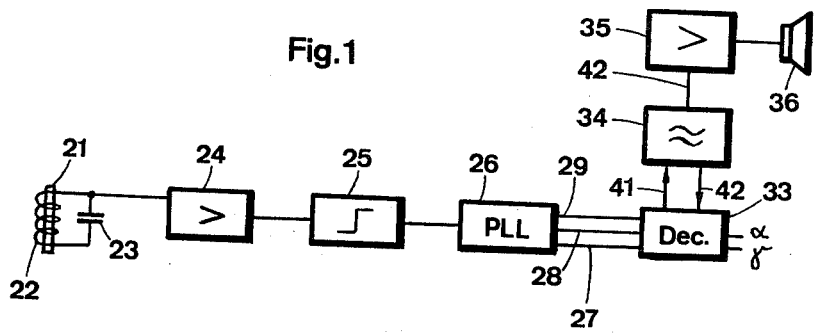
FIG. 1 is a block diagram circuit of a receiver of the system.

The receiver in accordance with FIG. 1 contains an antenna which consists of a magnetic core 21 and a coil 22, which forms a tuned circuit with a condenser 23. The antenna voltage is amplified in an amplifier 24 and limited in a limiter 25.

Demodulation is effected with the aid of a phase locked loop circuit 26, which delivers on line 27 the HF signal free of interference, on line 28 the data signal and on line 29 a control signal (lock signal) when the phase-locked loop is in action. Such circuits are readily available on the market, e.g. RCA COS/MOS CD4046A with lock defection circuit according to RCA Application Note ICAN-6101.

Figure 2:
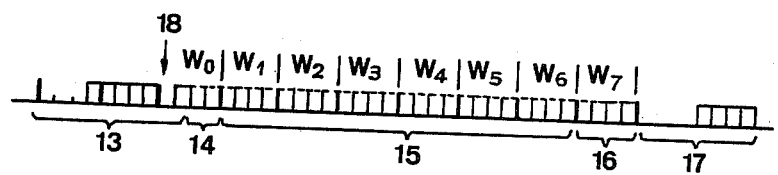
FIG. 2 is a graphic illustration showing the composition of a call telegram.

The data signal containing the call telegram is decoded in a decoder 33. When the call telegram address associated with the relevant receiver is received, the decoder 33 switches on an audio-frequency generator 34, the voltage of which is amplified by an amplifier 35 and energizes the loudspeaker 36, so that a call sounds from the relevant receiver. The composition of a call telegram is shown in FIG. 2. A call telegram contains forty (bits), forming a synchronization signal 13, two message bits 14, the call address 15 consisting of six code words of four bits each, and a parity word 16. The code words are labelled as follows: The last two bits of the synchronization signal and the two message bits: $w_o$; six codewords: $w_1$ through $w_6$; the parity word: $w_7$. The next call telegram can follow immediately beginning with a synchronization signal 13. If the transmitter is not switched off, filling signals 17 can be sent out during the intervals between the call telegrams.

Each code word consists of 4 bits, later referred to by a, b, c, d. The synchronization signal comprises 10 bits, namely the sequence 0001111101. Five different code word patterns are provided which are coded in a 2-out-of-4 code. Four address patterns A ... D which contain two consecutive identical bits are associated with the selective call and a group call pattern E which contains alternately the bits zero and one is associated with the group call.

The five patterns are:
A = 0011
B = 0110
C = 1100
D = 1001
E = 0101

The group call pattern E can replace anyone of the address patterns A ... D. To the group call ADABBE thus there would respond the receivers with the call telegram addresses:

ADABBA
ADABBB
ADABBC
ADABBD

The receiver with the call telegram address ADABBA would moreover also respond to group calls such as ADEBBA and ADEBBE. In this way manifold group call combinations can be obtained. With group call telegrams containing one E up to 4 subscribers and with those containing two Es up to 16 subscribers can be called at the same time, and so forth. The call telegram EEEEEE calls simultaneously all the receivers.

The parity word 16 is formed in that the longitudinal parity of the six call words 15 ($W_1$ ... $W_6$) and of the word $w_o$ formed from the last two bits of the synchronization signal 13 and the two message bits 14 is calculated in known manner. It is advantageous if the order of the parity bits differs from that of the word bits.

Figure 3:
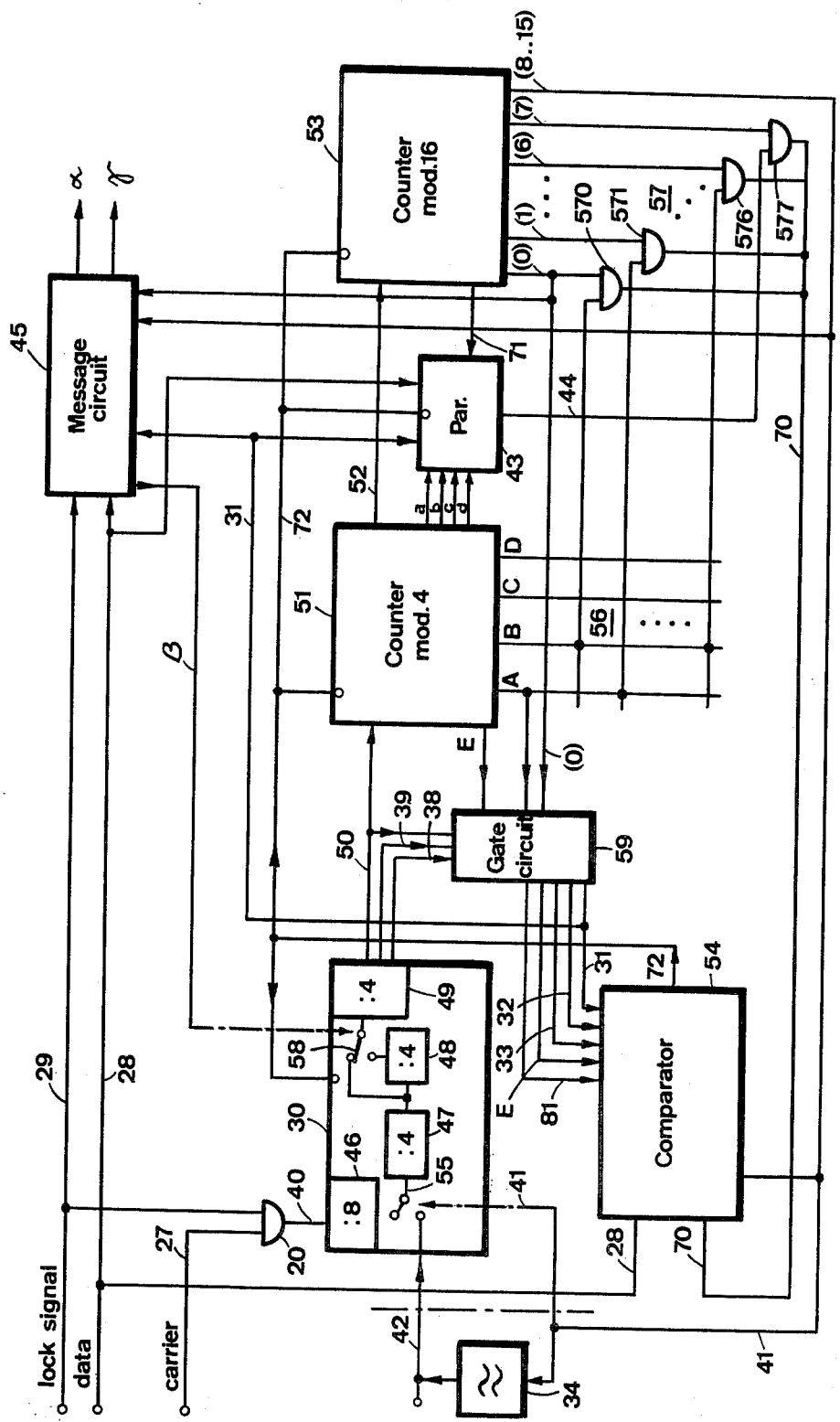
FIG. 3 is a schematic circuit diagram of the decoder contained in the receiver of FIG. 1.

FIG. 3 shows a block diagram of the decoder 33. The decoder has three inputs, as already shown in FIG. 2, namely an input 27 for the high frequency signal, an input 28 for the data signal and an input 29 for the lock signal. The high frequency signal goes via and AND-gate 20 to a divider-circuit 30, composed by four dividers 46, 47, 48, 49 dividing 8, 4, 4, 4 respectively. Via switch 55 the input of the second divider 47 can be connected either to the output of the first divider 46 or to the line 42. The switch 55 is controlled by signals on line 41. Via a second switch 58 the input of the fourth divider 49 can be connected to the output either of the second divider 47 or of the third divider 48, so that the division factor can be set either to 512 or to 128. The second switch 58 is controlled by singals on the line marked $\beta$.

When the high-frequency signal on line 27 and the lock signal on line 29 are present and the switch 55 stands in the position as shown, the divider circuit 30 delivers on line 50 a continious sequence of timing pulses, the frequency thereof is equal to the bit frequency on the data line 28, because the ratio of carrier frequency to bit frequency is chosen equal to 512.

The timing pulses on line 50 are delivered to a modulo 4 counter 51 which counts the bits and generates four pulses a, b, c, d, corresponding to the four bits of each word, and bit patterns A, B, C, D. Output line 52 of counter 51 carries pulses of the word frequency and is connected to the input of a modulo 16 counter 53 counting the code words and generating pulses (0) through (7) for corresponding counting states on lines assigned thereto and a pulse on line 41 for counting states (8) through (15). With the aid of the pulses (0) through (7) a code matrix 56, having its inputs connected to the A,B,C,D outputs of the counter 51, and a gate group 570 through 576 connected between the outputs of the code matrix 56 and of the counter 53, a bit pattern sequence corresponding to the address associated individually to the receiver is compiled. By means of six connecting points connecting each an output with one input of the matrix, the matrix is set to the individual address of the receiver.

In the comparator circuit 54 each word of this address and at the same time the group call pattern E are compared bit for bit with the addresses words of the received code telegram. If any address word of the received call telegram is neither equal to the simultaneously generated address pattern nor to the group call pattern the divider circuit 30 and counters 51 and 53 are reset at the end of the word, so that the word counter 53 does not attain the state (8). If however an address associated with the receiver is received, the word counter 53 reaches the position (8), and gives on line 41 a signal to the audio-frequency generator 34, which puts this into operation, so that it gives via the line 42 and amplifier 35 an audio-frequency signal to the loudspeaker 36 and a call signal becomes audible.

The signal on line 41 switches over at the same time the switch 55, so that now no longer the high-frequency input signal (divided by 8) but the audio-frequency on line (42) arrives at the input of the divider 47. The audio frequency is divided in the stages 47, 48, 49 of the divider 30 an further divided in the signal element counter 51, and the word counter 53 until this counter 53 goes to the state zero wherewith the signal on line 41 terminates thereby switching off the audio frequency generator 34 and switching back the switch 55. Thus the counters are also used for the determination of the call signal length and the use of a monostable multivibrator which is otherwise customary for this purpose is avoided.

The gate circuit 59 produces a set of timing pulse sequences from pulses received from the dividers 49 and the counters 51 and 53 for controlling the comparator circuit 54 via lines 31, 32, 33, 81. The parity word generator 43 adds modulo 2 the "Ones" of the received words $w_o \ldots w_7$ separately for each bit. The parity word so obtained is transmitted to the comparator 54 via line 44 and gate 577 when counter 53 is in state 7, and is compared with the received parity word in the same way as the address words selected by the matrix 56 are compared with the received address words. If in the word $w_o$ of the telegram at least one of the two last elements is equal to one, this represents message, which is received by the message circuit 45 and converted into a signal on one of the three lines $\alpha$, $\beta$ and $\gamma$ simultaneously to the activation of the audio generator 34.

Figure 4:
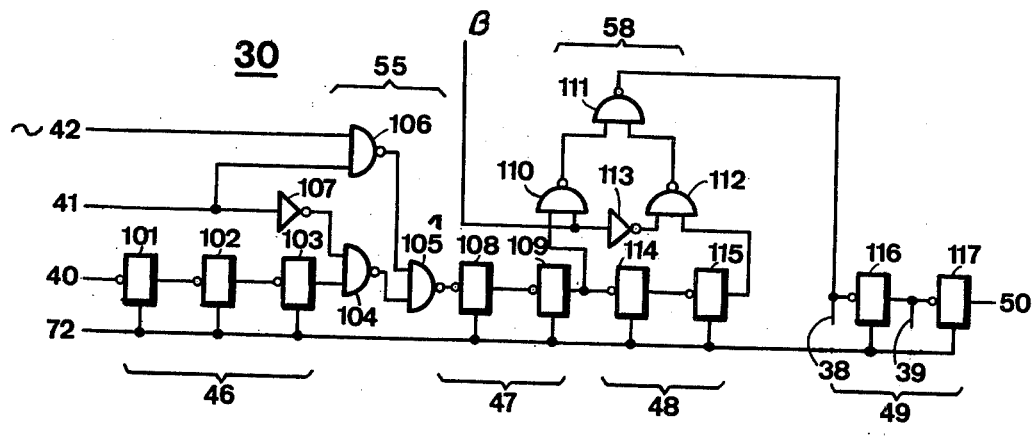
FIG. 4 is a divider circuit.

Now the different circuits of FIG. 3 will be described in detail:

FIG. 4 shows the divider circuit 30, which, as already mentioned comprises the dividers 46, 47, 48, 49 and the switches 55 and 58.

The divider 46 is formed by the flipflops 101, 102, 103, the switch 55 by the NAND-gates 104, 105, 106 and the inverter 107, the divider 47 by the flipflops 108 and 109, the switch 58 by the NAND-gates 110, 111, 112 and the inverter 113, the divider 48 by the flipflops 114 and 115, the divider 49 by the flipflops 116 and 117. The input of the divider 49 is labelled 38, its output 50, and the input of flipflop 117, 39.

Figure 5:
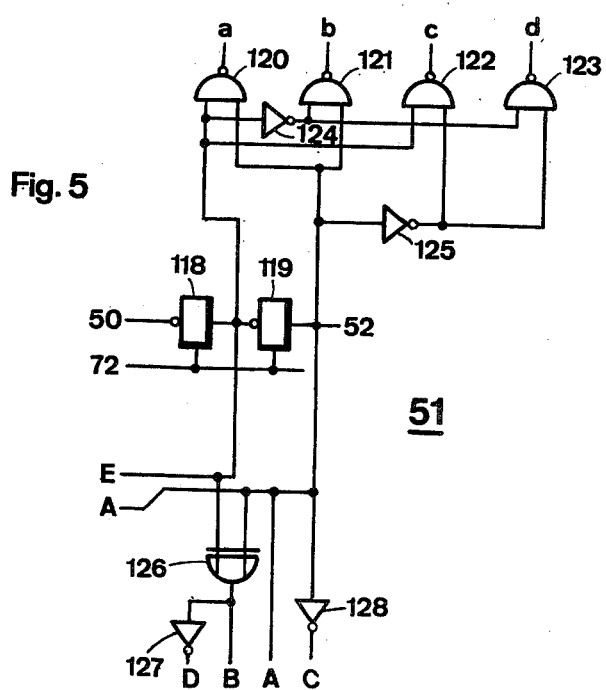
FIG. 5 is a circuit diagram of the element counter with associated gates.

The signal element counter 51 (FIG. 5) contains two flip-flops 118 and 119 the output signals of which are E and A respectively and gate circuits with the AND-gates 120 to 123, the EXOR-gate 126 and the inverters 124, 127 and 128, generating the pulses B, C, D, $a$, $b$, $c$, $d$ which are repeated for each word.

In FIG. 6 the pulse sequences are shown which are repeated during the reception of the words, $w_o$ to $w_7$. In the first five lines the input signals of the flipflop 116 (line 38) and the output signals of the flip-flops 116 (37), 117 (50), 118 (E), 119 (A), are shown (2) as well as other pulse sequences (31), (32), (33) (1) derived there from by means of the gate circuits shown on FIG. 4 and 5, (3) produced by the gate circuit 59.

The word counter contains four flip-flops the output signals of which are G, H, I, K shown in FIG. 7 and gate circuit which generate therefrom the output signals (0), (1) . . . (7) on corresponding states of the counter, and furthermore signals on line 71, as shown in FIG. 7.

Figure 8:
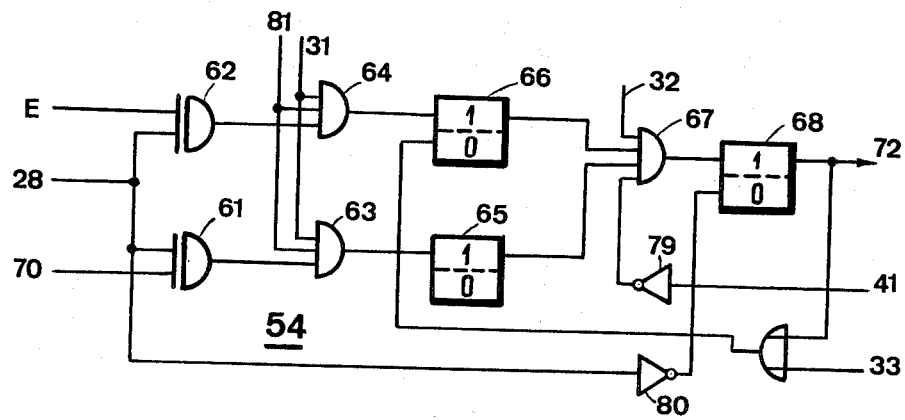
FIG. 8 is a comparison circuit.

The comparator circuit 54, (FIG. 8) contains an EXCLUSIVE-OR-circuit 61, to the input of which the data signal (line 28) and the output signal of the gates 570 to 577 (line 70) is applied, a second EXCLUSIVE-OR-circuit 62, to the input of which the data signal and the group call patterns E generated by the signal element counter 51 are applied, and two AND-gates 63 and 64, which connect the outputs of the two EXCLUSIVE-OR-circuits to the set inputs of the flip-flop 65 and 66 respectively. The Q-outputs of the flip-flops 65 and 66 are connected via a further AND-gate 67 to the set input of a flip-flop 68, at the set output of which the reset signal for the divider circuit 30 and the counters 51, 53, for the two flip-flops 65 and 66 and for the parity circuit 43 appears. The resetting of the flip-flop 68 is effected by the data signal on line 28. The flip-flop 68 is such that in the case of a 1 at the output of the gate 67 also the state of the line 72 goes to state 1 without regard to the state at the reset input. The other inputs of the gates 63 and 64 is connected to the outputs 31 and 81 of the gate circuit 59 and receives an interrogation pulse approximately in the middle of each signal element interval except the two message bits 14.

If in a word a mismatch of the received code word with the internally produced code word is defected, then the flip-flop 65 is set. If a received word is not equal to the group call word E, then the flip-flop 66 is set. At the end of each word the states of the two flip-flops 65 and 66 are interrogated by means of gate 67. If both flip-flops are set, the received word was neither equal to the code word associated with the receiver nor equal to the group call word E, then the flip-flop 68 is set and thus all the dividers 46 to 49, counters 51 and 53 and circuit 43 are reset via line 72. The reset signal blocks the operation of these circuits until the next 1 to 0 transition on the data input 28 appears. Than the circuits will be restarted.

The interrogation of the gate 67 takes place by means of a pulse emitted by the gate circuit 59 on line 32, shortly before the end of each code word but not in state 8 to 15 of the word counter 53, when it is blocked by the signal on line 41, inverted by inverter 79.

The operation of the comparison circuit will be illustrated with the aid of FIG. 7.

The line labelled (28) shows a group call telegram with the address ADABBE while line labelled (70) represents the pulses for the internally generated address ADABBD. The first five words are equal in the two addresses, therefore flip-flop 66 is not set, flip-flop 65 is set as soon as a bit of the received word is not equal to the corresponding bit of the group call word E. At the end of each word flip-flop 65 is reset. During the sixth word, flip-flop 66 is set but not flip-flop 65. Therefore no reset pulse is generated and counter 53 attains state 8, which causes the release of the acoustical signal.

The flip-flop 68 (via line 72) serves also for synchronizing the start of the dividers 46 to 49 and counters 51 and 53: The synchronization signal 13 is such that reliably during the 4th to 8th pulse the flip-flop 68 is set. This position is maintained until the data signal goes to zero. By the reset pulse on line 72 the dividers and also the flip-flops 65 and 66 are reset, so that at the set input of the flip-flop 68 the state zero occours. If the data signal now goes to zero, namely at the time disignated by 18 in FIG. 2, then flip-flop 68 is reset, the restoring signal on line 72 vanishes and the divider circuit 30 begins to work.

The word $W_o$ begins with the bits 01 and the same appear at the output of the gate 570, connected to the line (0), of the word counter 53, because the other input of that gate is supplied via matrix 56 with the signal B, whose first and second bits are also 01. During the third and fourth bits of $W_o$ (message bits) the flip-flops 65 and 66 do not switch, because the two gates 63 and 64 are blocked.

Figure 9:
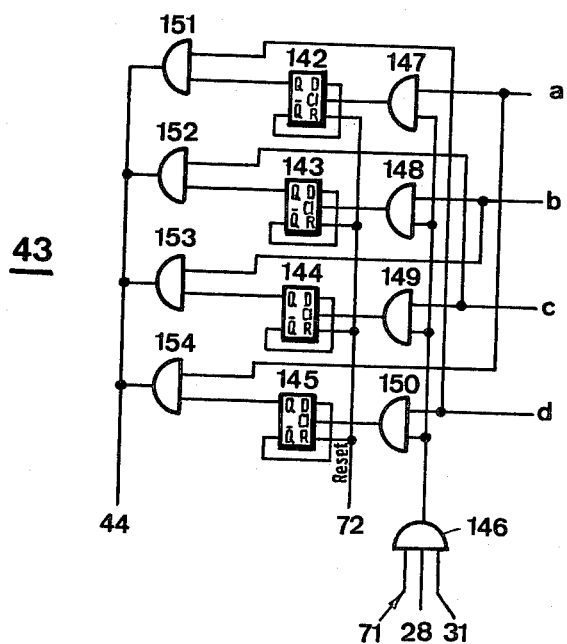
FIG. 9 is a parity circuit.

The parity circuit 43 (FIG. 9) serves for the calculation of the longitudinal parities. The parity circuit 43 receives from the signal element counter 51 the timing pulses $a, b, c, d,$ which appear each during one bit of each word, furthermore on line 31 a sensing pulse which samples approximately in the middle of each bit, the data signal appearing on line 28 by means of gate 146 as long as the signal on line 71 is present, i.e. during the words $W_o$ to $W_6$. The circuit contains four flip-flops 142, 143, 144, 145 connected to the lines carrying the signals $a, b, c, d,$ by means of the AND-gates 147, 148, 149, 160. The flip-flops 142, 143, 144, 145 count the Ones, modulo 2, occuring in the corresponding bits. During the bits of the seventh word $W_7$, the flip-flops 145, 144, 143, 142 are interrogated one after the other with the aid of an AND-gate 154, 153, 152, 151 at the output of each flip-flop and of the AND-gate 577. The parity word formed from the received data goes on the line 70 to the comparator 54 and is compared there with the received parity word. In the event of inequality, a reset signal is delivered at the end of the word to line 72 in the same way as described in connection with FIG. 8. Counter 53 does not attain state 8.

Figure 10:
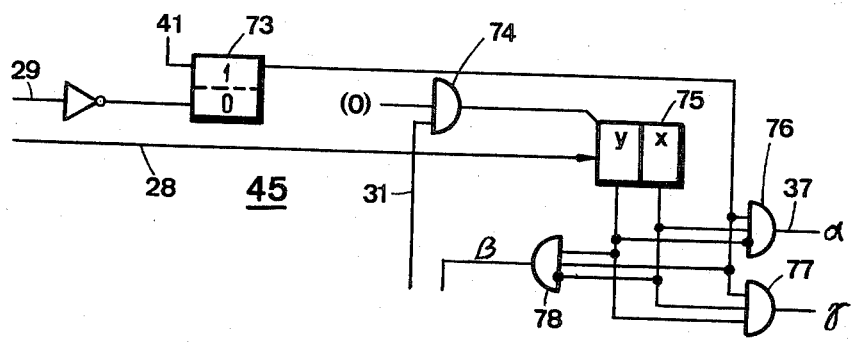
FIG. 10 is a message circuit.

The message circuit 45 (FIG. 10) serves to convert the received message bits 14 into control signals.

It comprises a flip-flop 73, which is set by the output 41 of the word counter 53 and reset by the negated lock signal of line 29. The 1-output of the flip-flop 73 is connected to one input of three AND-gates 76, 77, 78. 74 is an AND-gate, the inputs of which are connected to the sensing pulse line 31 and to the output (0) of the word counter 53. The output of the gate 74 supplies shift pulses for a two-stage shift register 75, to the two stages of which other inputs of the gates 76, 77 and 78 are connected, at the output $\alpha, \beta, \gamma$ of one thereof a message output signal appears of switching procedures are avialable. However, this happens only when the word counter 53 commes to the position 8. Than the flip-flop 73 is set via line 41 and the gates 76, 77 and 78 are enabled, so that for example the output $\alpha$ goes to 1, when in the call telegram intended for the station the first message bit was equal to 1, and the second equal to 0. The flip-flop 73 remains set until the transmitted carrier signal, is switched off and the lock signal 29 goes to zero.

Resetting of the shift register 75 is not needed; the stored bits are pushed out of the shift register upon the first call after the re-switching-on-of the carrier.

The terms and expressions which have been employed herein are used as terms of description and not of limitation, and there is no intention, in the use of such terms and expressions of excluding any equivalents of the features shown and described or portions thereof, but it is recognized that various modifications are possible within the scope of the invention claimed.

What I claim is:

1. In a wireless paging system, receivers for carrier frequency call telegrams,
   each call telegram (13-16) consisting of p code words, each code word consisting of $n$ bits,
   each call telegram including an address (15) composed of $m$ code words ($w_1$-$w_6$) which are selected from a plurality of code words including selective call code words (A, B, C, D) and one group call word (E);
   call telegrams for calling an individually selected receiver have an address (ADABBA) which is individually assigned to the respective receiver and consists only of selective call code words;
   group call telegrams for simultaneously calling a selected group of receivers have an address containing those selective call code words which are identical in the addresses of all receivers of the selected group, each code word which is not the same in the addresses of all of these receivers of the selected group is replaced by said group call code word (E);
   each receiver including:
   demodulator means (26) supplied by the carrier frequency call telegrams and delivering for each telegram the bit sequence corresponding thereto;
   clock pulses generating means (30) controlled by said demodulator means (26) and generating a clock pulse sequence in synchronism with the bits of the received telegram;
   bit sequences generating means (51, 53, 56, 57) controlled by said clock pulse sequence for generating synchronously to the reception of the bits of the code words of the received telegram a first and a second bit sequence, said first bit sequence is equal to the bit sequence of the individual address (ADABBA) of the receiver, and said second bit sequence (EEEEEE) consists of $m$ group call code words (E)
   means (54, 53) for comparing bit by bit and code word by code word the address of the received code telegram with said first and with said second bit sequence and delivering an output signal at the end of the reception of the address if each code word of the received address has matched with either the respective code word of the first or with that of the second bit sequence; and
   signalling means (34, 35, 36) supplied by said output signal and delivering an acoustical signal.

2. A wireless paging receiver as claimed in claim 1 wherein said bit sequences generating means comprise a first (51) and a second counter (53) and $m$ AND-gates (571-576);
   the first counter (51) has an input connected to said clock pulses generating means (30) and includes counting means modulo-n (118,119) controlled by said clock pulses, gating means (126), code word outputs each assigned to one of said selective call code words (A-D) and a group call output assigned to said group call code word (E), and a further output (52) which delivers a signal for every n-th clock pulse marking the end of a code word, said gating means (126) are connected between said counting means modulo-n (118,119) and certain of said code word outputs for delivering on each of these outputs the code word assigned thereto, the second counter (53) for counting code words has an input connected to said further input (52) of said first counter (51), and has p outputs ((1), (2), ... (7), and a further output ((8 ... 15)), m ((1), (2), ... (6)) of the p outputs are assigned each to the position of the first, second, ... m-th code word of the address of the receiver and are activated each for the corresponding state of the second counter, said further output ((8 ... 15)) is activated for at least one further state of the second counter;

each of said m AND-gates (571-576) has a first and a second input and one output, the first input of each of said AND-gates is connected to a respective one of said m outputs of said second counter (53), and the second input is connected to that output of said first counter (51) which delivers the selective call code word appearing at the code word position to which the respective one of the m-outputs of the second counter (53) is assigned;

said comparison means (54) including a first EXCLUSIVE-OR-gate (61) with a first input (28), connected to said demodulator means (26), a second input (70) connected to the outputs of said m AND-gates (571-576), and an output for delivering first mismatch signal, a second EXCLUSIVE-OR-gate (62) having a first input (28) connected to said demodulator means (26), a second input connected to the group call pattern output (E) of said first counter (51), and an output for delivering a second mismatch signal, means (65, 66) for storing the first and second mismatch signals until the end of each code word, means for generating a third mismatch signal if at the end of a code word a first and a second mismatch signal are stored, means for resetting the first and second counter by the third mismatch signal;

said signalling means including an audio frequency generator (34) having an activating input (41) connected to said further output ((8 ... 15)) of said second counter (53), and an acoustic signal generator (36) supplied by said audio frequency generator (34).

3. A wireless paging receiver as set forth in claim 2, wherein said clock pulse generating means (30) include first (46) and second counting means (47, 48, 49), and a change-over switch (55) having a first position, which is its rest position connecting the output of said first counting means (46) to the input of said second counting means (47, 48, 49), and a second position connecting the output (42) of the audio frequency generator (34) to the input of said second counting means (47, 48, 49), said changeover switch (55) is in its second position during a signal on said further output ((8 ... 15)) of said second counting means (47, 48, 49), thereby determining the duration of said supply of said of said acustical signal generator (34).

4. A wireless paging receiver as claimed in claim 3, comprising
means (45) for receiving, storing and decoding a message included in the received telegram and for delivering an output signal on a predetermined message,
a second change-over switch (58) for shunting at least one of a plurality of counting stages of said second counting means (47, 48, 49), said second change-over switch (58) is responsive to said output signal of said means (45) for receiving, storing and decoding said message, thereby changing the duration of said supply of said acustical signal generator (34).

5. A wireless paging receiver as claimed in claim 2, wherein the second inputs of said m AND-gates (571-576) are connected by means of a matrix (56) to the selective call code word outputs (A-D) of the first counter (51), the matrix(56) has a set of parallel first conductors connected each to a respective one of the said pattern outputs and a set of m parallel second conductors crossing said first conductors and connected each to the second input of a respective one of said m AND-gates (571-576), the matrix (56) is coded to the individual address of the receiver by connecting each of said second conductors to one of said first conductors.

6. A wireless paging receiver as claimed in claim 2, comprising
parity checking means (43) having a parity word generator, and an AND-gate (577) having a first input connected to the output (44) of the parity word generator and a second inlput connected to one of the outputs ((7)) of said second counter (53), said one of the outputs is activated after reception of the last code word of the address, the output of the said AND-gate (577) being connected to said second input (70) of said first EXCLUSIVE-OR-gate (61) included in said comparison means (54).

* * * * *